(12) United States Patent
Kubo et al.

(10) Patent No.: US 9,658,556 B2
(45) Date of Patent: May 23, 2017

(54) IMAGE DATA PROCESSING APPARATUS AND IMAGE DATA PROCESSING METHOD

(71) Applicant: FUJI XEROX CO., LTD., Tokyo (JP)

(72) Inventors: Masahiko Kubo, Kanagawa (JP); Kaoru Yamauchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/680,321

(22) Filed: Apr. 7, 2015

(65) Prior Publication Data

US 2016/0086060 A1  Mar. 24, 2016

(30) Foreign Application Priority Data

Sep. 18, 2014  (JP) .................................. 2014-189881

(51) Int. Cl.
| | |
|---|---|
| G03G 15/01 | (2006.01) |
| B41J 2/21 | (2006.01) |
| G06K 15/02 | (2006.01) |
| H04N 1/23 | (2006.01) |

(52) U.S. Cl.
CPC ........ *G03G 15/0121* (2013.01); *B41J 2/2117* (2013.01); *G06K 15/1878* (2013.01); *H04N 1/2346* (2013.01)

(58) Field of Classification Search
CPC ............... G03G 15/0121; B41J 2/2117; G06K 15/1878; G06K 15/188; G06K 15/407
See application file for complete search history.

(56) References Cited

U.S. PATENT DOCUMENTS

| | | | | |
|---|---|---|---|---|
| 8,995,020 B2* | 3/2015 | Okumura | ............. | G06K 15/188 347/100 |
| 2009/0033961 A1* | 2/2009 | Tamagawa | ........... | H04N 1/6022 358/1.9 |
| 2010/0177357 A1* | 7/2010 | Yoshida | ............... | G06K 15/407 358/3.21 |
| 2011/0221805 A1* | 9/2011 | Yoshida | ................. | B41J 2/2107 347/9 |
| 2011/0234660 A1* | 9/2011 | Yoshida | ................. | B41J 2/2117 347/9 |

(Continued)

FOREIGN PATENT DOCUMENTS

| | | |
|---|---|---|
| JP | 2009-055600 A | 3/2009 |
| JP | 2014-036243 A | 2/2014 |
| JP | 2014-074745 A | 4/2014 |

*Primary Examiner* — David Gray
*Assistant Examiner* — Carla Therrien
(74) *Attorney, Agent, or Firm* — Oliff PLC

(57) ABSTRACT

An image data processing apparatus includes a total-colorant-amount calculating unit that calculates a total amount of a metallic colorant and a process-color colorant used by an image forming apparatus to form an image having a unit area, the image forming apparatus forming an image by using a white colorant, the metallic colorant, and the process-color colorant; a white-colorant-amount specifying unit that specifies an amount of the white colorant used to form the image having a unit area on the basis of a calculation result obtained by the total-colorant-amount calculating unit; and a white-colorant-amount correcting unit that corrects the amount of the white colorant so that the amount of the white colorant used to form the image having a unit area decreases as the amount of the metallic colorant used to form the image having a unit area increases.

3 Claims, 16 Drawing Sheets

(56) References Cited

U.S. PATENT DOCUMENTS

| | | | |
|---|---|---|---|
| 2012/0056922 A1* | 3/2012 | Yoshida | B41J 2/2117 347/9 |
| 2012/0262509 A1* | 10/2012 | Sakai | B41J 2/04501 347/6 |
| 2013/0278660 A1* | 10/2013 | Tsuji | B41J 2/2117 347/14 |
| 2014/0043625 A1* | 2/2014 | Koyatsu | G06K 15/18 358/1.9 |
| 2014/0093267 A1 | 4/2014 | Kubo et al. | |
| 2015/0117875 A1* | 4/2015 | Kubo | G03G 15/0848 399/15 |
| 2015/0242733 A1* | 8/2015 | Kobayashi | G06K 15/1878 358/3.2 |

* cited by examiner

| EVALUATION ITEM | METALLIC LUSTER | | COLOR REPRODUCTION | |
|---|---|---|---|---|
| AMOUNT OF METALLIC TONER (%) | 100 | 50 | 100 | 50 |
| FIRST COMPARATIVE EXAMPLE | × | × | ○ | ○ |
| FIRST EXEMPLARY EMBODIMENT | ○ | ○ | ○ | ○ |

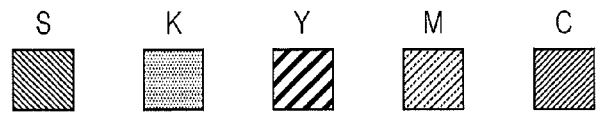
FIG. 13A
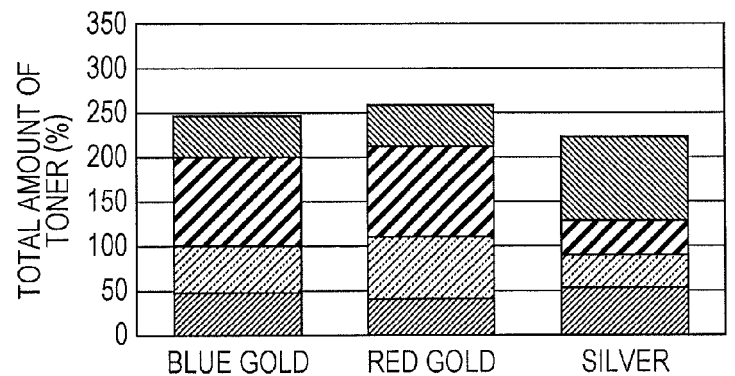
FIG. 13B
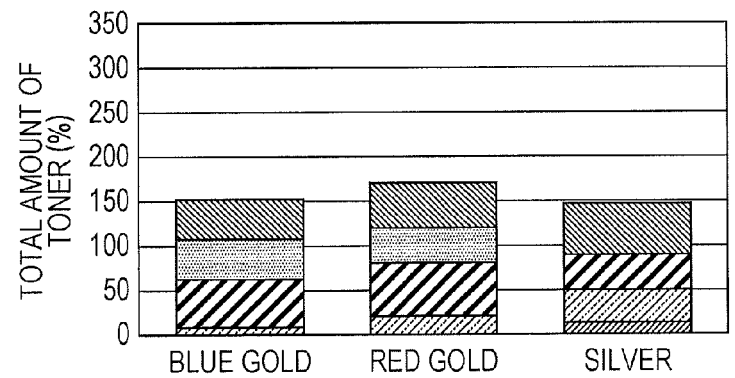
FIG. 13C
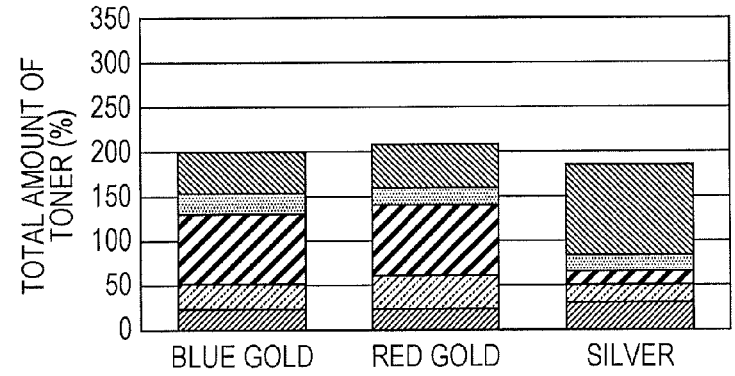

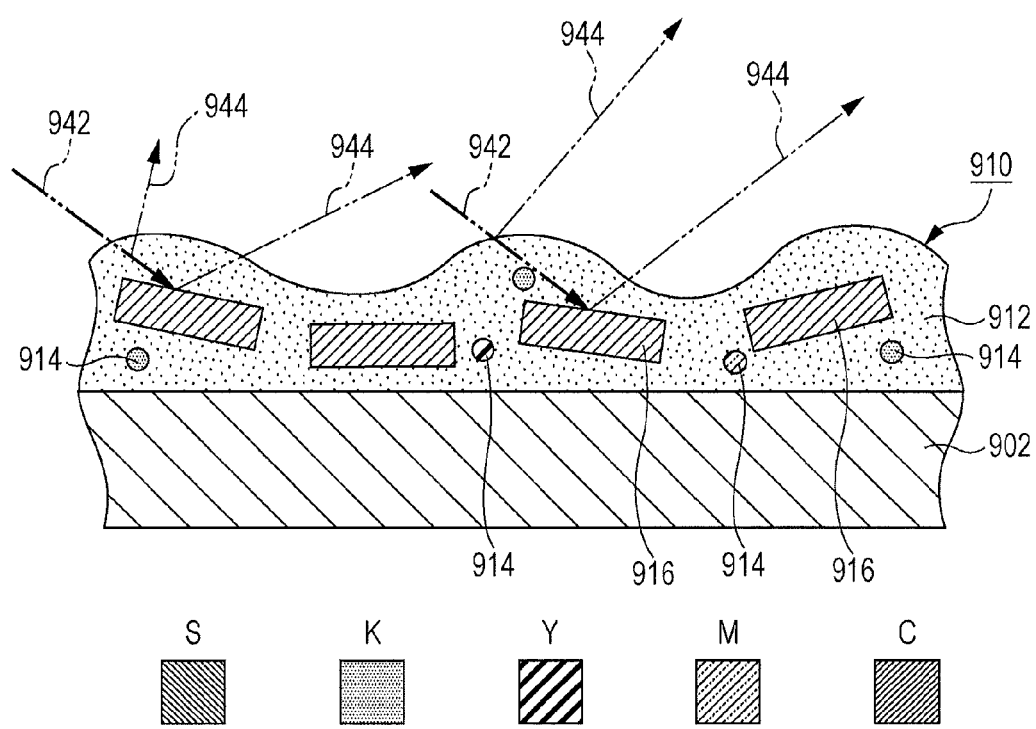

| EVALUATION ITEM | METALLIC LUSTER | | |
|---|---|---|---|
| NAME OF EXTRA COLOR | BLUE GOLD | RED GOLD | SILVER |
| SECOND COMPARATIVE EXAMPLE | × | × | × |
| SECOND EXEMPLARY EMBODIMENT | ○ | ○ | ○ |

IMAGE DATA PROCESSING APPARATUS AND IMAGE DATA PROCESSING METHOD

CROSS-REFERENCE TO RELATED APPLICATIONS

This application is based on and claims priority under 35 USC 119 from Japanese Patent Application No. 2014-189881 filed Sep. 18, 2014.

BACKGROUND

The present invention relates to an image data processing apparatus and an image data processing method.

SUMMARY

According to an aspect of the present invention, an image data processing apparatus includes a total-colorant-amount calculating unit that calculates a total amount of a metallic colorant and a process-color colorant used by an image forming apparatus to form an image having a unit area, the image forming apparatus forming an image by using a white colorant, the metallic colorant, and the process-color colorant respectively including a white pigment, a metallic pigment, and a process-color pigment that is not a white pigment or a metallic pigment; a white-colorant-amount specifying unit that specifies an amount of the white colorant used by the image forming apparatus to form the image having a unit area on the basis of a calculation result obtained by the total-colorant-amount calculating unit; and a white-colorant-amount correcting unit that corrects the amount of the white colorant specified by the white-colorant-amount specifying unit. The white-colorant-amount correcting unit corrects the amount of the white colorant used to form the image having a unit area so that the amount of the white colorant used to form the image having a unit area decreases as the amount of the metallic colorant used to form the image having a unit area increases.

BRIEF DESCRIPTION OF THE DRAWINGS

Exemplary embodiments of the present invention will be described in detail based on the following figures, wherein:

FIG. 13A illustrates image signals that have been processed by the image forming apparatus illustrated in FIG. 9 by adjusting the UCR ratio to 0% using a black-toner-amount adjusting unit;

FIG. 13B illustrates image signals that have been processed by adjusting the UCR ratio to 100% using the black-toner-amount adjusting unit;

FIG. 13C illustrates image signals that have been processed by adjusting the UCR ratio to 50% using the black-toner-amount adjusting unit;

FIG. 14 is a schematic sectional view of an image formed by the image forming apparatus illustrated in FIG. 9;

DETAILED DESCRIPTION

Hereinafter, exemplary embodiments of the present invention will be described with reference to the drawings.

Figure 1:
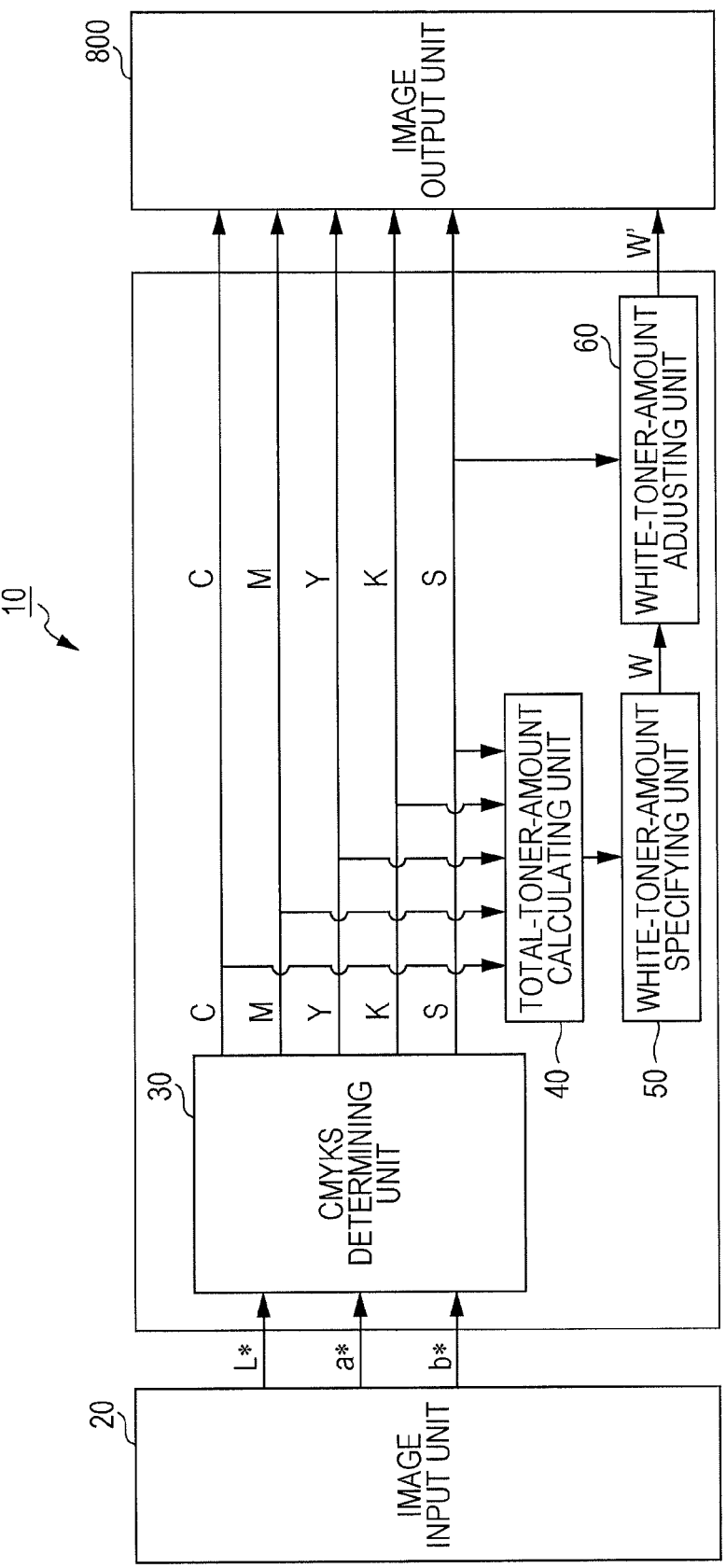
FIG. 1 is a block diagram of an image forming apparatus according to a first exemplary embodiment of the present invention.
Figure 2:
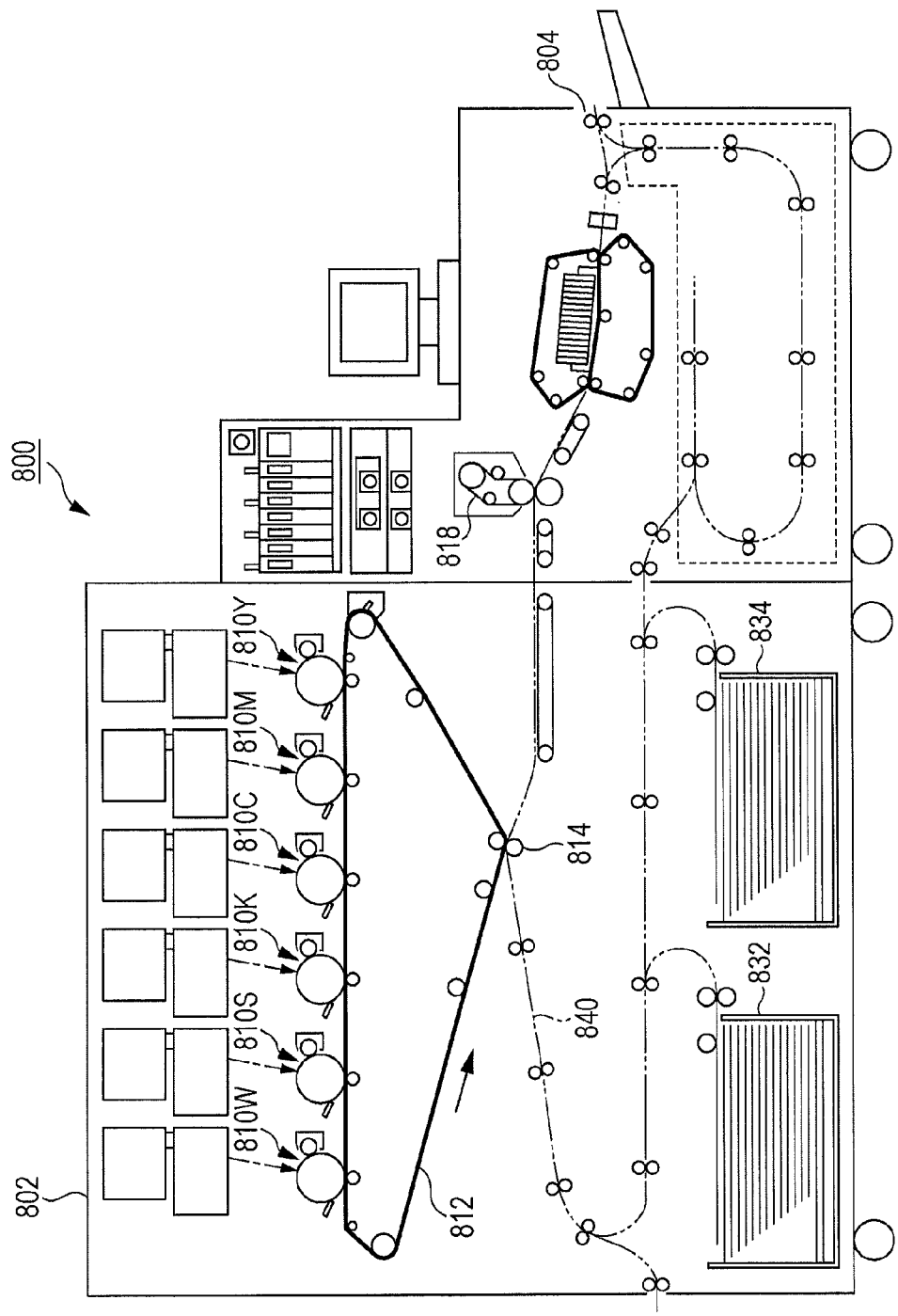
FIG. 2 is a sectional view of an image output unit of the image forming apparatus illustrated in FIG. 1.

FIG. 1 is a block diagram of an image forming apparatus 10 according to a first exemplary embodiment of the present invention. FIG. 2 is a sectional view of an image output unit 800 of the image forming apparatus 10. The image output unit 800 forms an image on a recording medium by using a white toner, which is used as a white colorant including a white pigment; a metallic toner that is used as a metallic colorant including a metallic-color pigment; and a cyan toner, a magenta toner, a yellow toner, and a black toner, each of which is used as a process-color colorant including a pigment that is not a white pigment or a metallic-color pigment.

As illustrated in FIG. 2, the image output unit 800 includes an image output unit body 802, a toner image forming unit 810Y, a toner image forming unit 810M, a toner image forming unit 810C, a toner image forming unit 810K, a toner image forming unit 810S, and a toner image forming unit 810W. The toner image forming units 810Y, 810M, 810C, 810K, 810S, and 810W, which are disposed in the image output unit body 802, respectively form a yellow toner image; a magenta toner image; a cyan toner image; a black toner image; a metallic toner image, such as a silver toner image; and a white toner image. It is not necessary that the image output unit 800 include all of the toner image forming units 810Y, 810M, 810C, 810K, 810S, and 810W. Alternatively, the image output unit 800 may include the image forming unit 810W; the toner image forming unit 810S; and at least one of the toner image forming units 810Y, 810M, 810C, and 810K.

The image output unit 800 further includes an intermediate transfer member 812. The intermediate transfer member 812 is an endless-belt-like member that rotates in the direction indicated by an arrow shown in FIG. 2. A yellow toner image, a magenta toner image, a cyan toner image, and a black toner image are respectively transferred from the toner image forming units 810Y, 810M, 810C, and 810K to the intermediate transfer member 812. Next, a metallic toner image is transferred from the toner image forming unit 810S. Lastly, a white toner image is transferred from the toner image forming unit 810W to the intermediate transfer member 812.

The image output unit 800 further includes a second-transfer device 814. The second-transfer device 814 transfers the toner images, which have been transferred to the intermediate transfer member 812, to a recording medium. At this time, the white toner image, which has been lastly transferred to the intermediate transfer member 812, is disposed at a position nearer to a surface of the recording medium than the other toner images are; the metallic toner is superposed on the white toner image; and the black, cyan, magenta, and yellow toner images are superposed on the metallic toner image.

The image output unit 800 further includes a fixing unit 818. The fixing unit 818 fixes the toner images, which have been transferred to the recording medium, to the recording medium by using, for example, heat and pressure. The recording medium, to which the fixing unit 818 has fixed the toner images, is output to the outside of the image output unit body 802 through an output slot 804.

The image output unit 800 further includes a tray 832 for holding recording medium and a tray 834 for holding recording medium. The tray 834 and the tray 832 are capable of holding, for example, recording media of types that are different from each other. For example, the tray 832 holds opaque black sheets as recording media, and the tray 834 holds recording media of a different type, such as transparent resin films.

A transport path 840 for transporting a recording medium is formed in the image output unit body 802. The transport path 840 transports a recording medium from one of the trays 832 and 834 to the second-transfer device 814, to the fixing unit 818, and to the output slot 804.

If the image output unit 800, structured as described above, forms an image on a recording medium that is not white and an image on a white recording medium by using the same amounts of yellow, magenta, cyan, black, and metallic toners, the color of the image formed on the recording medium that is not white does not look the same as that of the image formed on the white recording medium. This is because, while a surface of a white recording medium reflects light, a surface of, for example, a black recording medium absorbs a certain amount of light. Therefore, the image output unit 800 forms a white toner layer as the lowermost layer of the toner images (nearest to a recording medium) to cover a colored surface of the recording medium so that the recording medium reflects light as the white recording medium does. The image output unit 800 forms an image in such a way that yellow, magenta, cyan, black, and metallic toners are superposed on the white toner layer, thereby improving color reproduction of image data.

There is a limitation on the amount of toner that the image output unit 800, structured as described above, is capable of using in order to form an image having a unit area, such as an area corresponding to a pixel. If the maximum amount of each of a yellow toner, a magenta toner, a cyan toner, a black toner, a metallic toner, and a white toner that the image output unit 800 is capable of transferring to a unit area of a recording medium is defined as 100%, the total amount of toner that the image output unit 800 is capable of using in order to form an image having a unit area is limited to, for example, 300% or less. Such a limitation occurs due mainly to the second-transfer device 814 and the fixing unit 818. To be specific, such a limitation on the total amount of toner that is usable for forming an image having a unit area occurs because, if the total amount of toner became 300% or more, it would be difficult for the second-transfer device 814 to transfer toner images from the intermediate transfer member 812 to a recording medium, and it would be difficult for the fixing unit 818 to fix the toner images to a recording medium.

In the image output unit 800 structured as described above, if the orientation of the metallic-color pigment in an image formed in a recording medium is low (if the directions of the particles of the metallic-color pigment are random), the relative amount of diffuse reflection light reflected by the surface of the image is large. In this case, it is difficult to obtain metallic luster (see FIG. 7).

It is not necessary that the image output unit 800 transfer a yellow toner image, a magenta toner image, a cyan toner image, a black toner image, a white toner image, and a metallic toner image to the intermediate transfer member 812 and then transfer the toner images from the intermediate transfer member 812 to a recording medium as described above. Alternatively, the image output unit 800 may directly transfer a yellow toner image, a magenta toner image, a cyan toner image, a black toner image, a white toner image, and a metallic toner image to a recording medium. In this case, the toner image forming unit 810Y, the toner image forming unit 810M, the toner image forming unit 810C, the toner image forming unit 810K, the toner image forming unit 810S, and the toner image forming unit 810W are arranged so that a white toner image is first transferred to a surface of a recording medium, a metallic toner image is transferred onto the white toner image, and a yellow toner image, a magenta toner image, a cyan toner image, and a black toner image are transferred onto the metallic toner image.

It is not necessary that the image output unit 800 be an electrophotographic system that uses a toner as a colorant as described above. Alternatively, the image output unit 800 may be an inkjet system that uses an ink as a colorant. In this case, the image output unit 800 first forms an image on a recording medium by using a white ink; forms an image by using a metallic ink on the white ink; and forms images by using a black ink, a cyan ink, a magenta ink, and a yellow ink on the image that has been output by using the metallic ink.

As illustrated in FIG. 1, the image forming apparatus 10 includes an image input unit 20, a CMYKS determining unit 30, a total-toner-amount calculating unit 40, a white-toner-amount specifying unit 50, and a white-toner-amount correcting unit 60, in addition to the image output unit 800.

Image data is input to the image input unit 20 from the outside. To be specific, the input image data is, for example, CMYK four-color bitmap image data that is generated by, for example, interpreting print data described in a page description language or the like, or generated by converting an RGB image or the like, which has been read by using a scanner or the like, into a device-independent CMYK color space of four printing colors. The input image data may be, for example, a color signal in the LAB color space (L*a*b* color signal). The input image data may be a color signal in a device-independent color space, such as the LUV color space and the sRGB color space, or a color signal in a device-dependent color space, such as the RGB color space. The input image data may be specified by using an extra color name and converted to a corresponding color signal.

The CMYKS determining unit 30 converts the image data input to the image input unit 20 to a device-independent color toner signal corresponding to the color reproduction characteristics of the image output unit 800 and determines the cyan, magenta, yellow, black, and metallic components of the converted color toner signal. The cyan, magenta, yellow, black, and metallic components respectively correspond to the densities (the amounts per unit area) of the cyan, magenta, yellow, black, and metallic toners.

The total-toner-amount calculating unit 40, which is used as a total-colorant-amount calculating unit, calculates the total amount of the metallic toner and the process-color toners used to form an image having a unit area. In other words, the total-toner-amount calculating unit 40 calculates the total amount of the metallic toner; and the cyan toner, the magenta toner, the yellow toner, and the black toner, each of which corresponding to a process-color toner.

The white-toner-amount specifying unit 50, which is used as a white-colorant-amount specifying unit, specifies the amount of the white toner used to form an image having a unit area on the basis of the total amount of the metallic toner and the process-color toners, which has been calculated by the total-toner-amount calculating unit 40. The details of the white-toner-amount specifying unit 50 will be described below.

The white-toner-amount correcting unit 60, which is used as a white-colorant-amount correcting unit, corrects the amount of the white toner, which has been specified by the white-toner-amount specifying unit 50, on the basis of the amount of the metallic toner used to form an image having a unit area, which has been output from the CMYKS determining unit 30. The details of the white-toner-amount correcting unit 60 will be described below.

Figure 3:
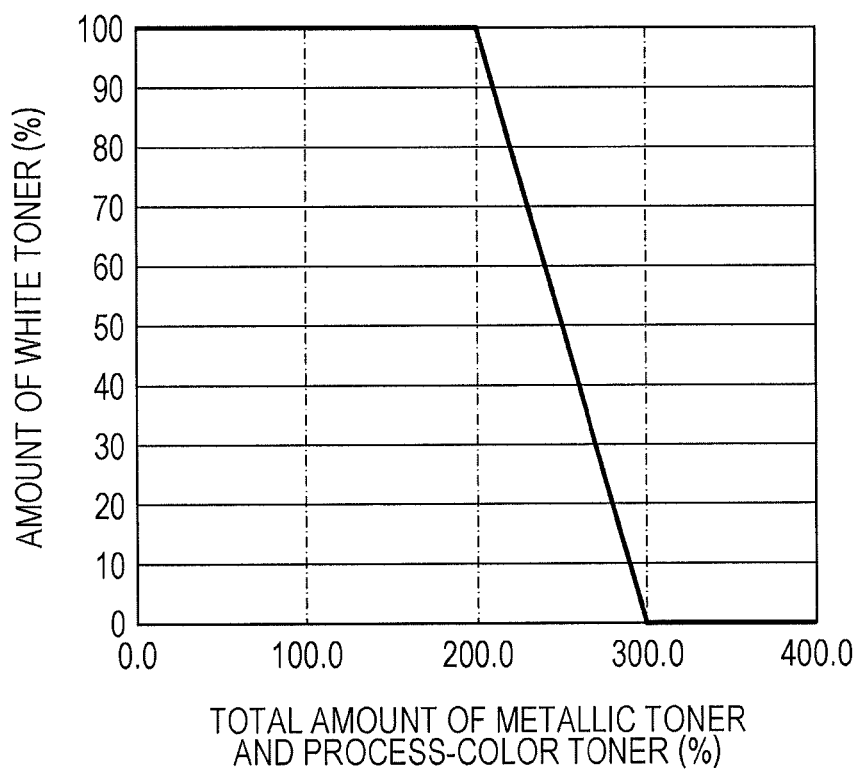
FIG. 3 is a graph illustrating the function of a white-toner-amount specifying unit of the image forming apparatus illustrated in FIG. 1.

FIG. 3 illustrates the function of the white-toner-amount specifying unit 50. As illustrated in FIG. 3, the white-toner-amount specifying unit 50 specifies the amount of the white toner to be 100% if the total amount of the metallic toner and the process-color toners (cyan toner, magenta toner, yellow toner, and black toner), which has been calculated by the total-toner-amount calculating unit 40, is less than 200%. If the total amount of the metallic toner and the process-color toners is 200% or more and 300% or less, the white-toner-amount specifying unit 50 specifies the amount of the white toner so that the total amount of the metallic toner, the process-color toners, and the white toner becomes 300%. The white-toner-amount specifying unit 50 specifies the amount of the white toner to be 0% if the total amount of the metallic toner and the process-color toners is 300% or more.

As described above, the white-toner-amount specifying unit 50 specifies the amount of the white toner so that the total amount of the white toner, the metallic toner, and the process-color toners used to form an image having a unit area becomes 300% or less, which is in a range in which the image output unit 800 is capable of outputting the image. Therefore, a transfer failure in the second-transfer device 814 or a fixing failure in the fixing unit 818, which might occur if the total amount of the metallic toner, the white toner, and the process-color toners exceeded 300%, does not occur.

Figure 4:
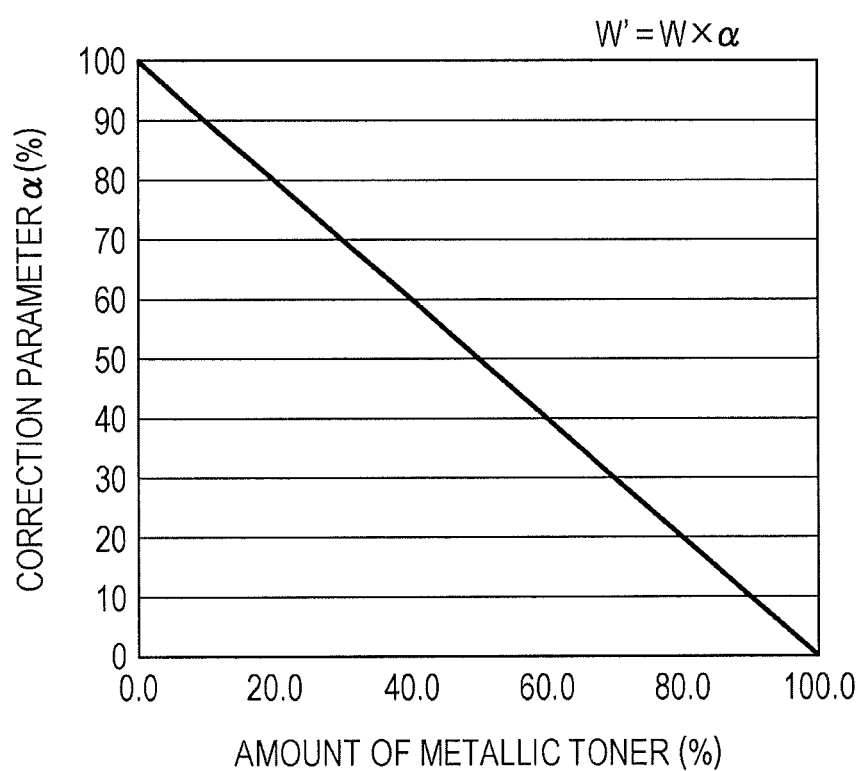
FIG. 4 is a graph illustrating the function of a white-toner-amount correcting unit of the image forming apparatus illustrated in FIG. 1.

FIG. 4 illustrates the function of the white-toner-amount correcting unit 60. In FIG. 4, the horizontal axis represents the amount of the metallic toner used to form an image having a unit area, which has been output from the CMYKS determining unit 30; and the vertical axis represents a correction parameter $\alpha$, by which the amount W of the white toner specified by the white-toner-amount specifying unit 50 is multiplied. The white-toner-amount correcting unit 60 corrects the amount of the white toner so that the corrected amount W' of the white toner is W×$\alpha$. As illustrated in FIG. 4, the correction parameter $\alpha$ is determined so that the amount of the white toner used to form an image having a unit area, which has been output from the CMYKS determining unit 30, decreases as the amount of the metallic toner used to form the image having a unit are increases.

For example, if the amount of the metallic toner output from the CMYKS determining unit 30 is 50%, the correction parameter $\alpha$ is 50% and the white toner is used only by 50% of the amount specified by the white-toner-amount specifying unit 50. If the amount of the metallic toner output from the CMYKS determining unit 30 is 100%, the correction parameter $\alpha$ is 0% and the white toner is not used at all. In these cases, for example, if an opaque black sheet or the like is used as a recording medium, the function of the white toner for shielding the surface of the recording medium may be reduced or eliminated, and the color reproduction might be reduced. However, as with the white toner, the metallic toner has the function of shielding the surface of a recording medium. Therefore, reduction in the effect of the white toner of shielding the surface of a recording medium due to a decrease of the amount of the white toner is offset by the effect of the metallic toner of shielding the surface of the recording medium. Accordingly, even if the amount of the white toner is reduced, decrease of color reproduction is not likely to occur.

Figure 5:
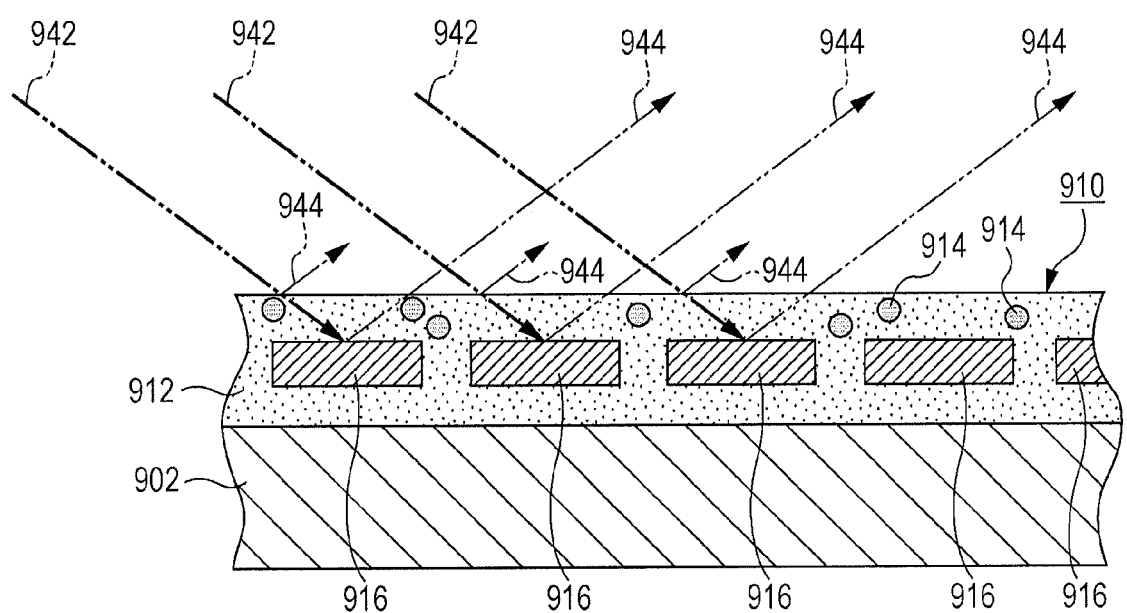
FIG. 5 is a schematic sectional view of an image formed by the image forming apparatus illustrated in FIG. 1.

FIG. 5 is a schematic sectional view of a toner image 910 output to a recording medium from the image output unit 800 of the image forming apparatus 10. The toner image 910 is formed when the amount of the metallic toner output from the CMYKS determining unit 30 is 100% and the correction parameter $\alpha$ of the white-toner-amount correcting unit 60 is 0%, that is, without using the white toner.

As illustrated in FIG. 5, the toner image 910, which is formed on a surface of a recording medium 902, includes a toner binder 912, process-color colorant particles 914 (particles of yellow, magenta, cyan, or black colorant) that are dispersed in the toner binder 912, and metallic colorant particles 916. White colorant particles 918 (see FIG. 7) are not present between the metallic colorant particles 916 and the recording medium 902. Therefore, the directions of the metallic colorant particles 916 are not made random by the white colorant particles 918, and the orientation of the metallic colorant particles 916 is improved. Accordingly, the proportion of specular reflectance in reflected light 944, which is the reflection of incident light 942 on the surface of the toner image 910 and the surfaces the metallic colorant particles 916, is high. As a result, the metallic luster of the toner image 910 is improved.

Figure 6:
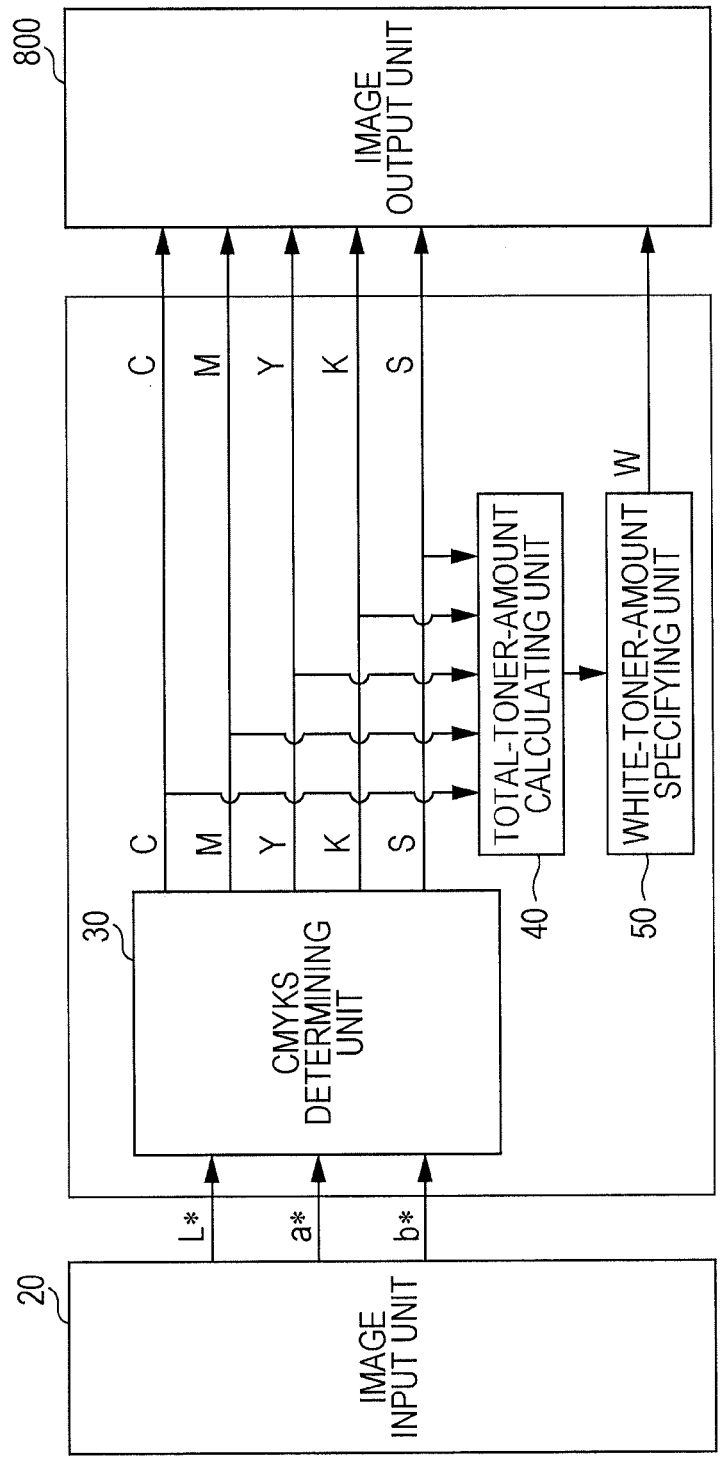
FIG. 6 is a block diagram of an image forming apparatus according to a first comparative example.

FIG. 6 is a block diagram of an image forming apparatus 10 according to a first comparative example. As described above, the image forming apparatus 10 according to the first exemplary embodiment includes the image input unit 20, the CMYKS determining unit 30, the total-toner-amount calculating unit 40, the white-toner-amount specifying unit 50, the image output unit 800, and the white-toner-amount correcting unit 60 (see FIG. 1). In contrast, the image forming apparatus 10 according to the first comparative example includes the image input unit 20, the CMYKS determining unit 30, the total-toner-amount calculating unit 40, the white-toner-amount specifying unit 50, and the image output unit 800; but does not include the white-toner-amount correcting unit 60.

Figures 7, 8:
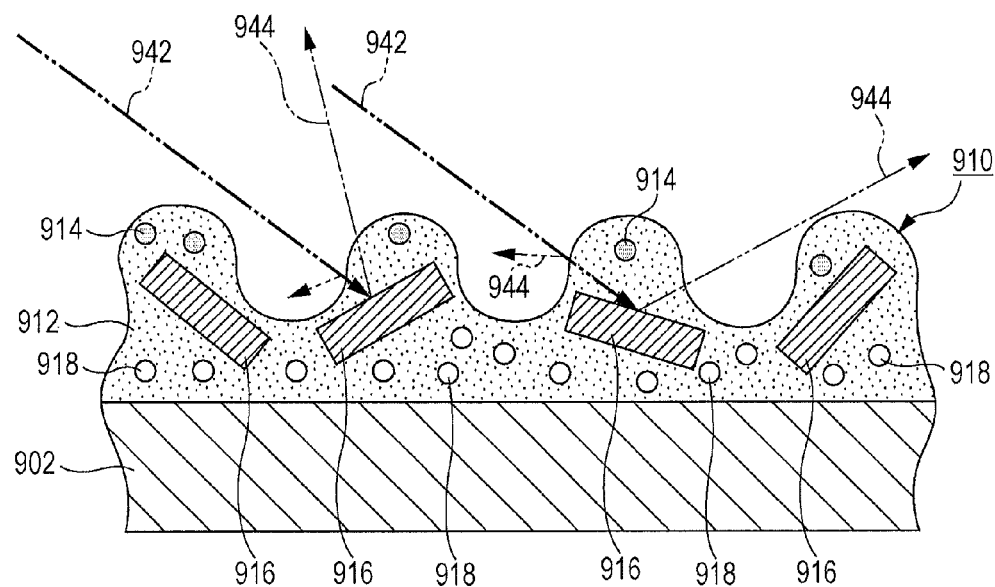
FIG. 7 is a schematic sectional view of an image formed by the image forming apparatus illustrated in FIG. 6.
FIG. 8 is a table showing the results of evaluating an image formed by the image forming apparatus according to the first exemplary embodiment of the present invention and an image formed by the image forming apparatus according to the first comparative example.

FIG. 7 is a schematic sectional view of a toner image 910 output to a recording medium from the image output unit 800 of the image forming apparatus 10 according to the first comparative example. As described above, in the toner image 910 formed by the image forming apparatus 10 according to the first exemplary embodiment, white colorant particles 918 are not present between the metallic colorant particles 916 and the recording medium 902 (see FIG. 5). In contrast, in the toner image 910 formed by the image forming apparatus 10 according to the first comparative example, white colorant particles 918 are present between the metallic colorant particles 916 and the recording medium 902.

The directions of the metallic colorant particles 916 are random due to the presence of the white colorant particles 918. Because the directions of the metallic colorant particles 916 are random, the sizes of protrusions and recesses on the surface of the toner image 910 are large. Therefore, the orientation of the metallic colorant particles 916 is low. Accordingly, the proportion of diffuse reflection in reflected light 944, which is the reflection of incident light 942 on the surface of the toner image 910 and the surfaces of the metallic colorant particles 916, is high. As a result, the luster of the toner image 910 is reduced.

FIG. 8 is a table showing the results of evaluating a toner image 910 formed by the image forming apparatus 10 according to the first exemplary embodiment of the present invention and a toner image 910 formed by the image forming apparatus 10 according to the first comparative example. In FIG. 8, "○" represents a good evaluation, and "x" represents a bad evaluation.

As shown in FIG. 8, in the evaluation of the toner image 910 formed by the image forming apparatus 10 according to the first exemplary embodiment of the present invention, both the metallic luster and the color reproduction are good in both of the cases where the amounts of the metallic toner are 100% and 50%. In contrast, in the evaluation of the toner image 910 formed by the image forming apparatus 10 according to the comparative example, the color reproduction is good but the metallic luster of the toner image 910 is bad in both of the cases where the amounts of the metallic toner are 100% and 50%.

As described above, the image forming apparatus 10 according to the first exemplary embodiment of the present invention includes the image input unit 20, the CMYKS determining unit 30, the total-toner-amount calculating unit 40, the white-toner-amount specifying unit 50, the white-toner-amount correcting unit 60, and the image output unit 800. Alternatively, the image output unit 800 may be structured as an independent image forming apparatus; and the image input unit 20, the CMYKS determining unit 30, the total-toner-amount calculating unit 40, the white-toner-amount specifying unit 50, and the white-toner-amount correcting unit 60 may be structured as an image data processing apparatus, such as a controller.

Figure 9:
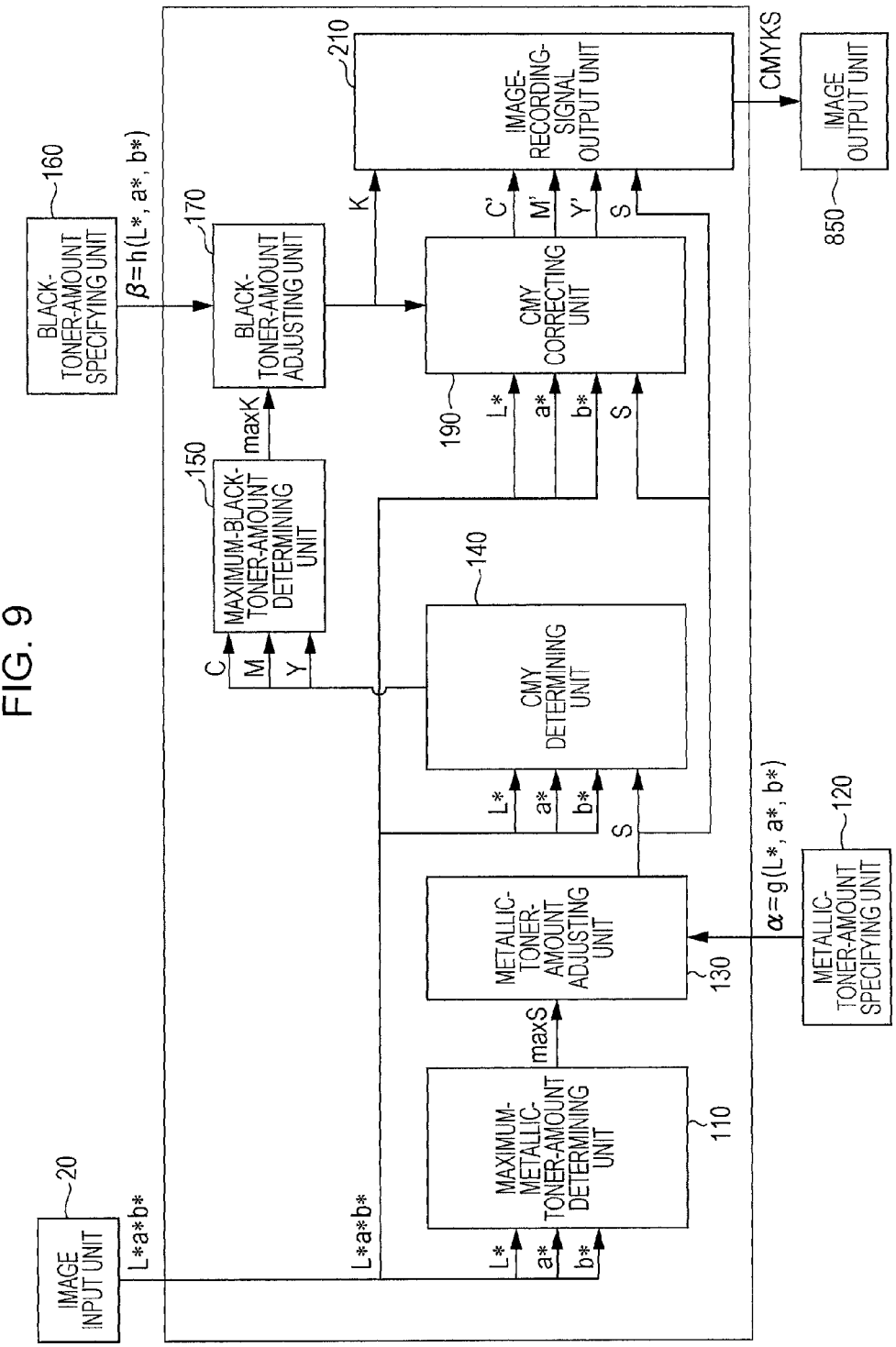
FIG. 9 is a block diagram of an image forming apparatus according to a second exemplary embodiment of the present invention.
Figure 10:
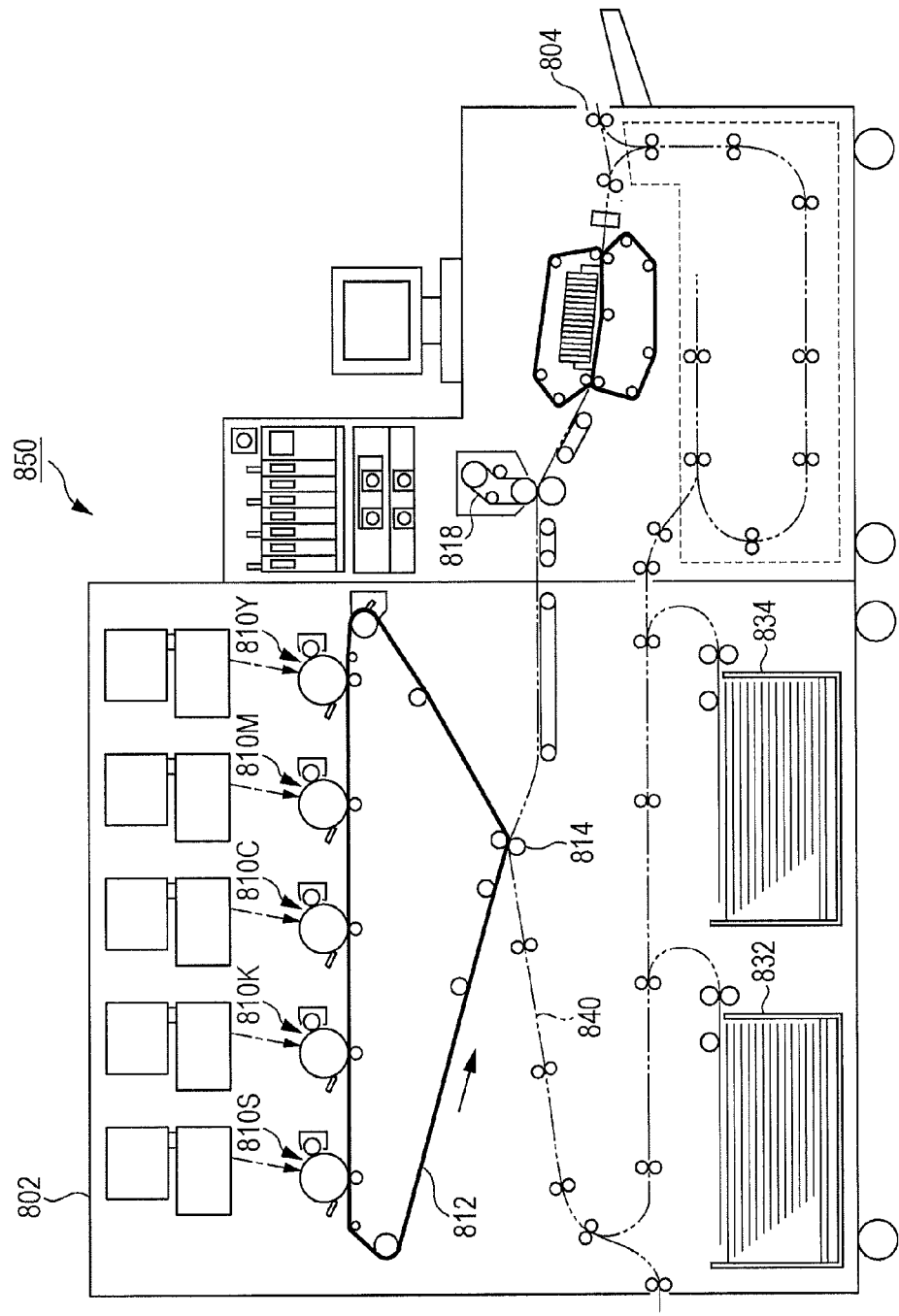
FIG. 10 is a sectional view of an image output unit of the image forming apparatus illustrated in FIG. 9.

FIG. 9 is a block diagram of an image forming apparatus 10 according to a second exemplary embodiment of the present invention. FIG. 10 is a sectional view of an image output unit 850 of the image forming apparatus 10 illustrated in FIG. 9. The image output unit 850 outputs an image to a recording medium by using a black toner, a metallic toner, a cyan toner, a magenta toner, and a yellow toner. The black toner is used as a black colorant that includes a black pigment. The metallic toner is used as a metallic colorant that includes a metallic pigment. Each of the cyan toner, magenta, and yellow toners is used as a process-color colorant that includes a process-color pigment that is not a black pigment or a metallic pigment.

In the first exemplary embodiment described above, the image output unit 800 includes the toner image forming units 810Y, 810M, 810C, 810K, 810S, and 810W, which respectively form yellow, magenta, cyan, black, metallic (such as silver), and white toner images. In contrast, the image output unit 850 according to the second exemplary embodiment includes the toner image forming units 810Y, 810M, 810C, 810K, and 810S; but does not include the toner image forming unit 810W. The other components of the image output unit 850 are the same as those of the image output unit 800. Therefore, description of such components will be omitted.

In the image output unit 850, yellow, magenta, cyan, and black toner images are first transferred to the intermediate transfer member 812 respectively from the toner image forming units 810Y, 810M, 810C, and 810K. Next, a metallic toner image is transferred to the intermediate transfer member 812 from the toner image forming unit 810S. Then, the toner images are transferred to a recording medium by the second-transfer device 814. At this time, the metallic toner image, which is last transferred to the intermediate transfer member 812, is disposed at a position nearer to a surface of the recording medium than the other toner images are. The black, cyan, magenta, and yellow toner images are superposed on the metallic toner image.

As with the image output unit 800 described above, with the image output unit 850 structured as described above, if the orientation of the metallic-color pigment in an image formed on the recording medium is low (if the directions of the metallic-color pigment particles are random), the relative amount of diffuse reflection light reflected by the surface of the image is large. In this case, it is difficult to obtain metallic luster (see FIG. 17).

As illustrated in FIG. 9, the image forming apparatus 10 includes, in addition to the image output unit 850 described above, the image input unit 20, a maximum-metallic-toner-amount determining unit 110, a metallic-toner-amount specifying unit 120, a metallic-toner-amount adjusting unit 130, a CMY determining unit 140, a maximum-black-toner-amount determining unit 150, a black-toner-amount specifying unit 160, a black-toner-amount adjusting unit 170, a CMY correcting unit 190, and an image-recording-signal output unit 210.

To the image input unit 20, for example, a color signal (L*a*b* color signal) in the LAB color space is input from the outside as image data. To be specific, for example, data of extra color ink and data of color samples are input as a color signal in the LAB color space. Instead of a color signal in the LAB color space, bitmap image data or the like of CMYK four colors may be input. For example, such bitmap image data may be generated by interpreting print data described in a page description language or by converting an image read by a scanner or the like to a device-independent CMYK color space, which is a color space of four printing colors. The input data may be a color signal in a device-independent color space, such as the LUV color space or the sRGB color space, or a color signal in a device-dependent color space, such as RGB. The input image data may be specified by an extra color name or the like and may be converted to a corresponding color signal.

The maximum-metallic-toner-amount determining unit 110, which is used as a maximum-metallic-colorant-amount determining unit, determines a maximum metallic toner amount maxS, which is the maximum amount of the metallic toner that is allowed to be used when reproducing a color signal input from the image input unit 20. For example, it is possible to determine the maximum metallic toner amount maxS as follows. For the image output unit 850, the relationship between the color components of a color signal, which are cyan, magenta, yellow, black, and metallic components, and the colorimetric value $L^*a^*b^*$ at this time is obtained beforehand as the following function (hereinafter referred to as "printer model"): $(L^*, a^*, b^*)=f(C, M, Y, K, S)$.

The maximum metallic toner amount maxS, which is the maximum amount of the metallic toner that satisfies the input $L^*a^*b^*$ color signal is calculated and determined by obtaining a numerical solution of the printer model by changing the amount S of the metallic toner while setting the amount of the black toner at zero.

For example, the metallic-toner-amount specifying unit 120 is used by an operator to specify the metallic luster of an image in accordance with the operator's preference for the image quality. For example, the metallic-toner-amount specifying unit 120 allows the operator to select one of the following four levels of the metallic luster: "strong metallic luster", "intermediate metallic luster", "weak metallic luster", and "no metallic luster".

The metallic-toner-amount adjusting unit 130, which is used as a metallic-colorant-amount adjusting unit, adjusts the amount of the metallic toner to be smaller than or equal to the maximum metallic toner amount maxS determined by the maximum-metallic-toner-amount determining unit 110. To be specific, the metallic-toner-amount adjusting unit 130 determines an under-color removal (UCR) ratio $\alpha=g(L^*, a^*, b^*)$ on the basis of, for example, the metallic luster specified by an operator by using the metallic-toner-amount specifying unit 120. Then, the metallic-toner-amount adjusting unit 130 adjusts the amount of the metallic toner by multiplying the maximum metallic toner amount maxS, which has been determined by the maximum-metallic-toner-amount determining unit 110, by a as follows: $S=\alpha \times maxS$. The details of the metallic-toner-amount adjusting unit 130 will be described below.

The CMY determining unit 140, which is used as a process-color-colorant-amount determining unit, determines the amounts of the process-color toners (C toner, M toner, and Y toner) and the amount of the metallic toner used to reproduce the input $L^*a^*b^*$ color signal without using the black toner. To be specific, the CMY determining unit 140 determines the amounts of the cyan toner, the magenta toner, and the yellow toner to be used when the black toner is not used from the $L^*a^*b^*$ color signal input from the image input unit 20 and the amount S of the metallic toner adjusted by the metallic-toner-amount adjusting unit 130 by using the following expression, which is the inverse transform of the aforementioned printer model: $(C, M, Y)=f^{-1}(L^*, a^*, b^*, K=0, S)$.

The maximum-black-toner-amount determining unit 150, which is used as a maximum-black-colorant-amount determining unit, determines the maximum black toner amount maxK, which is the maximum amount of the black toner that is allowed to be used when reproducing the $L^*a^*b^*$ color signal input to the image input unit 20 on the basis of the amounts of the process-color toners, which are the amounts of the cyan toner, the magenta toner, and the yellow toner determined by the CMY determining unit 140. The maximum black toner amount maxK is determined as an amount at which β, which is the UCR ratio of the black toner, is 100%. In other words, the maximum black toner amount maxK is determined so that the sum of the amounts of the cyan toner, the magenta toner, and the yellow toner is the smallest.

The black-toner-amount specifying unit 160 is used by an operator to specify the amount of black toner to be used in accordance with, for example, the operator's preference for the image quality. For example, it is possible for the operator to specify the amount of the black toner by inputting the ratio of the amount of the black toner to the maximum black toner amount maxK determined by the maximum-black-toner-amount determining unit 150 in percentage terms. In other words, the black-toner-amount specifying unit 160 allows the operator to specify the UCR ratio $\beta=h(L^*, a^*, b^*)$ when the black toner is used.

The black-toner-amount adjusting unit 170, which is used as a black-colorant-amount adjusting unit, adjusts the amount of the black toner K to be smaller than or equal to the maximum black toner amount maxK determined by the black-toner-amount specifying unit 160. In other words, the black-toner-amount adjusting unit 170 adjust the amount K of the black toner by using β, which is the UCR ratio of the black toner specified by an operator by using the black-toner-amount specifying unit 160, as follows: $K=\beta \times maxK$.

The CMY correcting unit 190 is used as a process-color-colorant adjusting unit. The CMY correcting unit 190 corrects the amounts of the process-color colorants, which have been determined by the CMY determining unit 140 to reproduce an input color signal by using the metallic toner and the process-color toners (the cyan, magenta toner, and yellow toners) on the basis of the amount S of the metallic toner and the amount K of the black toner. The amount S is an amount that is smaller than or equal to the maximum metallic toner amount maxS determined by the maximum-metallic-toner-amount determining unit 110 and that is adjusted, as necessary, by the metallic-toner-amount adjusting unit 130. The amount K is an amount that is smaller than or equal to the maximum black toner amount maxK determined by the maximum-black-toner-amount determining unit 150 and that is adjusted, as necessary, by the black-toner-amount adjusting unit 170. To be specific, the CMY correcting unit 190 obtains a corrected amount C' of the cyan toner, a corrected amount M' of the magenta toner, and a corrected amount Y' of the yellow toner by using the inverse transform of the aforementioned printer model as follows: $(C', M', Y')=f^{-1}(L^*, a^*, b^*, K=K, S)$.

The image-recording-signal output unit 210 outputs, to the image output unit 850, the amount K of the black toner adjusted by the black-toner-amount adjusting unit 170; the amount S of the metallic toner adjusted by the metallic-toner-amount adjusting unit 130; and the amounts C', M', and Y', which are respectively the amounts of the cyan, yellow, magenta toners adjusted by the CMY correcting unit 190.

It is not necessary that the image forming apparatus 10 include the metallic-toner-amount specifying unit 120 and the metallic-toner-amount adjusting unit 130. In the case where the image forming apparatus 10 does not include the metallic-toner-amount specifying unit 120 and the metallic-toner-amount adjusting unit 130, the maximum metallic toner maxS, which is the maximum amount of the metallic toner determined by the maximum-metallic-toner-amount determining unit 110, is output to the CMY determining unit 140, the CMY correcting unit 190, and the image-recording-signal output unit 210 without being adjusted.

It is not necessary that the image forming apparatus 10 include the black-toner-amount specifying unit 160 and the black-toner-amount adjusting unit 170. In the case where the image forming apparatus 10 does not include the black-toner-amount specifying unit 160 and the black-toner-amount adjusting unit 170, the maximum black toner amount maxK, which is the maximum amount of the black toner determined by the maximum-black-toner-amount determining unit 150, is output to the CMY correcting unit 190 and the image-recording-signal output unit 210 without being adjusted.

Figure 11A:
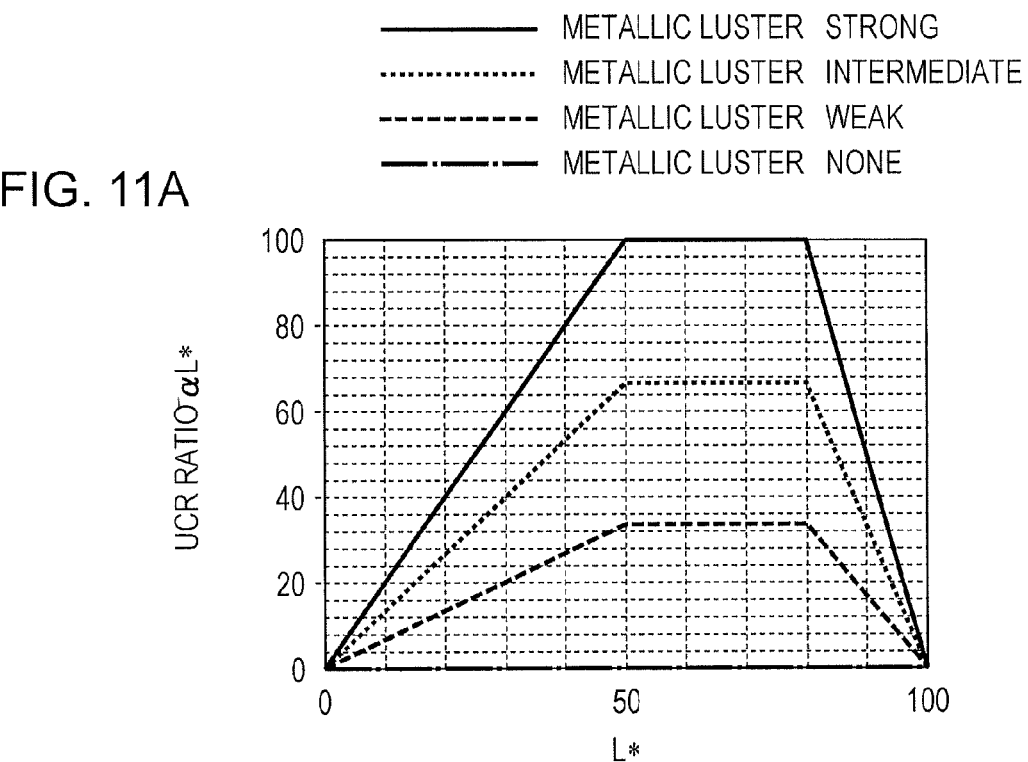
FIG. 11A is a graph illustrating the adjustment of UCR ratio in accordance with lightness, which is the function of a metallic-toner-amount adjusting unit of the image forming apparatus illustrated in FIG. 9.
Figure 11B:
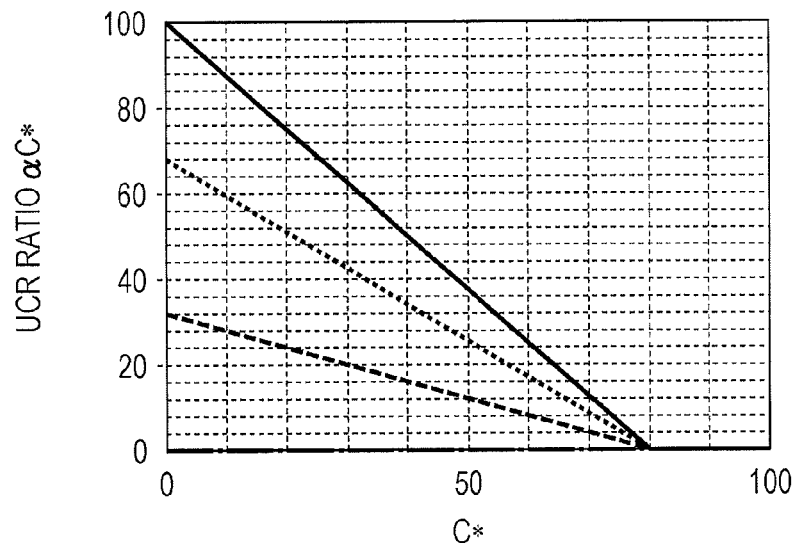
FIG. 11B is a graph illustrating the adjustment of UCR ratio in accordance with chroma, which is the function of the metallic-toner-amount adjusting unit.

FIGS. 11A and 11B illustrate the function of the metallic-toner-amount adjusting unit 130.

The effect of metallic luster produced by the metallic toner is higher for a color having a higher lightness and a lower chroma in an image signal. Therefore, it is desirable that the UCR ratio be increased for a color having a higher lightness and that the UCR ratio be increased for a color having a lower chroma. Therefore, as illustrated FIGS. 11A and 11B, the metallic-toner-amount adjusting unit 130 is capable of setting the UCR ratio, for example, at four levels corresponding to the levels of metallic luster. When an operator specifies the level of metallic luster by using the metallic-toner-amount specifying unit 120, the metallic-toner-amount adjusting unit 130 selects a UCR ratio corresponding to the level of the metallic luster specified by the operator. It is desirable that, the UCR ratio α be determined by an expression α=αL*×αC*, where αL* and αC* are respectively the UCR ratio related to lightness shown in FIG. 11A and the UCR ratio related to chroma shown in FIG. 11B.

As illustrated in FIG. 11A, the metallic-toner-amount adjusting unit 130 improves the metallic luster by reducing the UCR ratio for a lightness (L*=50 to 80) close to that of a recording medium, such as a paper sheet or the like, and by increasing the UCR ratio in a high-lightness range (L*=80 to 100). This is because, if the UCR ratio is increased for lightness close to that of a recording medium, such as a sheet of paper, the metallic toner might be transferred onto the recording medium. In a low-lightness range (L*<50), the UCR ratio is set low, because, if the amount of the metallic toner is large, lightness cannot be reduced and color reproduction is reduced. As illustrated in FIG. 11B, also regarding a color having high chroma, if the amount of the metallic toner is large and the chroma cannot be increased, color reproduction is reduced. Therefore, the UCR ratio for a low-chroma range is set to be high, while the UCR ratio for a high-chroma range set to be low.

The UCR ratio β for the black-toner-amount adjusting unit 170 may be set in the same way as the UCR ratio α described above.

Figure 12:
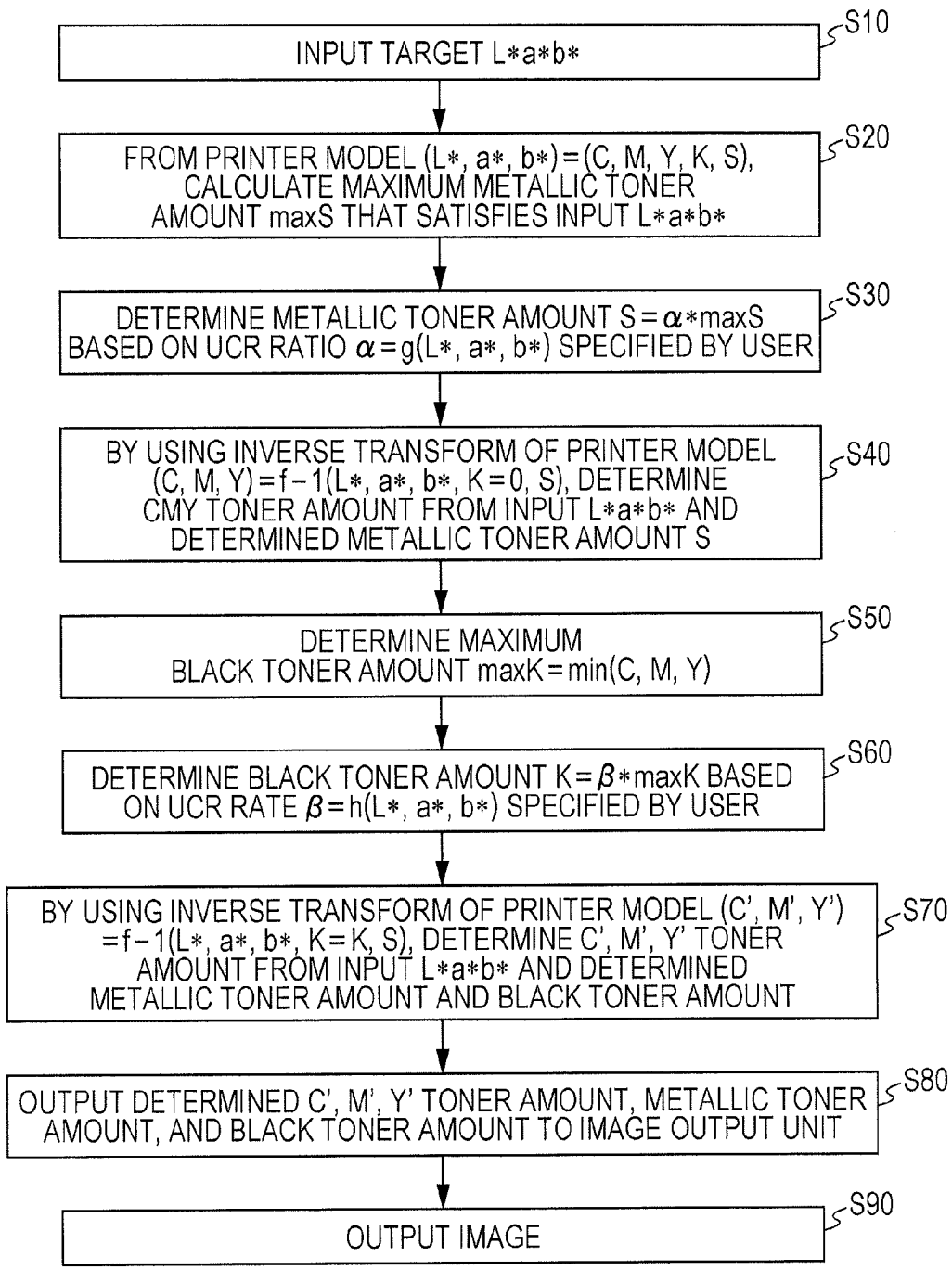
FIG. 12 is a flowchart of the operation of the image forming apparatus illustrated in FIG. 9.

FIG. 12 is a flowchart of the operation of the image forming apparatus 10 according to the second exemplary embodiment of the present invention. As illustrated in FIG. 12, in step S10, a target L*a*b* is input to the image input unit 20.

In step S20, the maximum-metallic-toner-amount determining unit 110 calculates the maximum metallic toner amount maxS, which is the maximum amount of the metallic toner that satisfies the input L*a*b* by using the printer model (L*, a*, b*)=f(C, M, Y, K, S).

In step S30, the metallic-toner-amount adjusting unit 130 adjusts the amount S of the metallic toner S=α×maxS on the basis of the UCR ratio α=g(L*, a*, b*), which is specified by an operator by using the metallic-toner-amount specifying unit 120.

In step S40, the CMY determining unit 140 determines the amount C of the cyan toner, the amount K of the magenta toner, and the amount Y of the yellow toner from the input L*a*b* and the amount of the metallic toner adjusted by the metallic-toner-amount adjusting unit 130 by using the inverse transform of the printer model (C, M, Y)=f$^{-1}$(L*, a*, b*, K=0, S).

In step S50, the maximum-black-toner-amount determining unit determines the maximum black toner amount maxK from the amounts C of the cyan toner, the amount M of the magenta toner, and the amount Y of the yellow toner determined by the CMY determining unit 140.

In step S60, the black-toner-amount adjusting unit 170 adjusts the amount K of the black toner K=β×maxK on the basis of the UCR ratio β=h(L*, a*, b*), which is specified by an operator by using the black-toner-amount specifying unit 160.

In step S70, the CMY correcting unit 190 adjusts the amounts of the cyan, magenta, and yellow toners to obtain the adjusted toner amounts C', M', and Y' by using the inverse transform of the printer model (C', M', Y')=f$^{-1}$(L*, a*, b*, K=K, S) from the input L*a*b*, the amount S of metallic toner adjusted by the metallic-toner-amount adjusting unit 130, and the amount K of black toner adjusted by the black-toner-amount adjusting unit 170.

In step S80, the image-recording-signal output unit 210 outputs, to the image output unit 850, the adjusted amounts C', M', and Y' of the toners adjusted by the CMY correcting unit 190, the amount S of the metallic toner adjusted by the metallic-toner-amount adjusting unit 130, and the amount K of the black toner adjusted by the black-toner-amount adjusting unit 170.

In step S90, the image output unit 850 outputs an image on the basis of a signal from the image-recording-signal output unit 210.

FIG. 13A illustrates image signals that have been processed by the image forming apparatus according to the second exemplary embodiment by adjusting the UCR ratio to 0% using the black-toner-amount adjusting unit 170. FIG. 13B illustrates image signals that have been processed by adjusting the UCR ratio to 100% using the black-toner-amount adjusting unit 170. FIG. 13C illustrates image signals that have been processed by adjusting the UCR ratio to 50% using the black-toner-amount adjusting unit 170. In each of FIGS. 13A to 13C, the bar on the left side represents an image signal for an extra color "blue gold", the bar at the middle represents an image signal for an extra color "red gold", and the bar on the right side represents an image signal for an extra color "silver".

As shown in FIGS. 13A to 13C, for the "blue gold" image signal, the total toner amount is slightly less than 250% when the UCR ratio is adjusted to 0% using the black-toner-amount adjusting unit 170. The total toner amount is decreased to about 150% when the UCR ratio is adjusted to 100% using the black-toner-amount adjusting unit 170, and the total toner amount is decreased to about 200% when the UCR ratio is adjusted to 50% using the black-toner-amount adjusting unit 170. For the "red gold" image signal, the total toner amount is slightly more than 250% when the UCR ratio is adjusted to 0% using the black-toner-amount adjusting unit 170. The total toner amount is decreased to about 170% when the UCR ratio is adjusted to 100% using the black-toner-amount adjusting unit 170, and the total toner amount is decreased to slightly more than 200% when the UCR ratio is adjusted to 50% using the black-toner-amount adjusting unit 170. For the "silver" image signal, the total toner amount is about 220% when the UCR ratio is adjusted to 0% using the black-toner-amount adjusting unit 170. The total toner amount is decreased to slightly less than 150% when the UCR ratio is adjusted to 100% using the black-toner-amount adjusting unit 170, and the total toner amount is decreased to about 180% when the UCR ratio is adjusted to 50% using the black-toner-amount adjusting unit 170.

FIG. 14 a schematic sectional view of a toner image 910 output to a recording medium from the image output unit 850 of the image forming apparatus 10 according to the second exemplary embodiment of the present invention. The toner image 910 is formed by setting the UCR ratio to 100% by using the black-toner-amount adjusting unit 170.

As illustrated in FIG. 14, the toner image 910, which is formed on a surface of a recording medium 902, includes a toner binder 912, process-color colorant particles 914 (particles of yellow, magenta, cyan, or black colorant) that are dispersed in the toner binder 912, and metallic colorant particles 916. Due to the UCR processing performed by using the black-toner-amount adjusting unit 170, the number of the yellow, magenta, cyan, and black colorant particles 914 is smaller than that of a case where the UCR processing is not performed. Therefore, as compared with a case where the UCR processing is not performed and a large number of colorant particles 916 are dispersed in the toner binder 912 (see FIG. 17), the orientation of the metallic colorant particles 916 is improved. Accordingly, the proportion of specular reflectance in reflected light 944, which is the reflectance of incident light 942 on the surface of the toner image 910 and the surfaces the metallic colorant particles 916, is high. As a result, the luster of the toner image 910 is improved.

Figure 15:
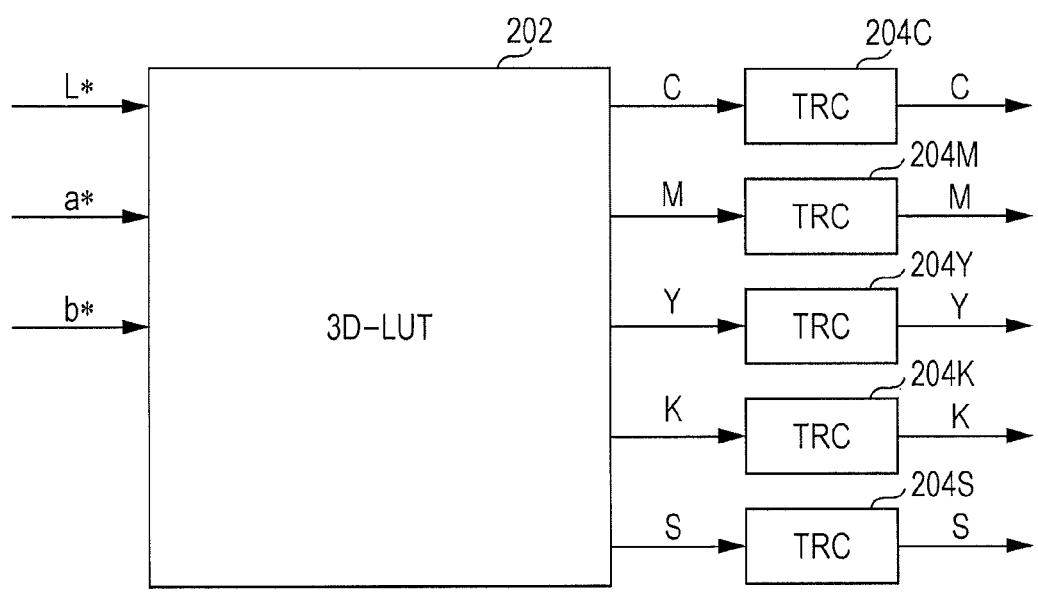
FIG. 15 is a block diagram of an image forming apparatus according to a modification of the second exemplary embodiment of the present invention.

FIG. 15 is a block diagram of the image forming apparatus 10 according to a modification of the second exemplary embodiment of the present invention. The modification includes a lookup table (LUT) 202; and a TRC 204C, a TRC 204M, a TRC 204Y, a TRC 204K, and a TRC 204S, which are tone reproduction curve (TRC) units for cyan, magenta, yellow, black, and metallic colors, respectively.

In contrast to the second exemplary embodiment of the present invention (see FIG. 9), this modification does not include the maximum-metallic-toner-amount determining unit 110, the metallic-toner-amount specifying unit 120, the metallic-toner-amount adjusting unit 130, the CMY determining unit 140, the maximum-black-toner-amount determining unit 150, the black-toner-amount specifying unit 160, and the black-toner-amount adjusting unit 170. Instead, the modification includes the LUT 202. The LUT 202 performs signal processing operations that are performed by the maximum-metallic-toner-amount determining unit 110, the metallic-toner-amount specifying unit 120, the metallic-toner-amount adjusting unit 130, the CMY determining unit 140, the maximum-black-toner-amount determining unit 150, the black-toner-amount specifying unit 160, and the black-toner-amount adjusting unit 170 in the second exemplary embodiment of the present invention.

Figure 16:
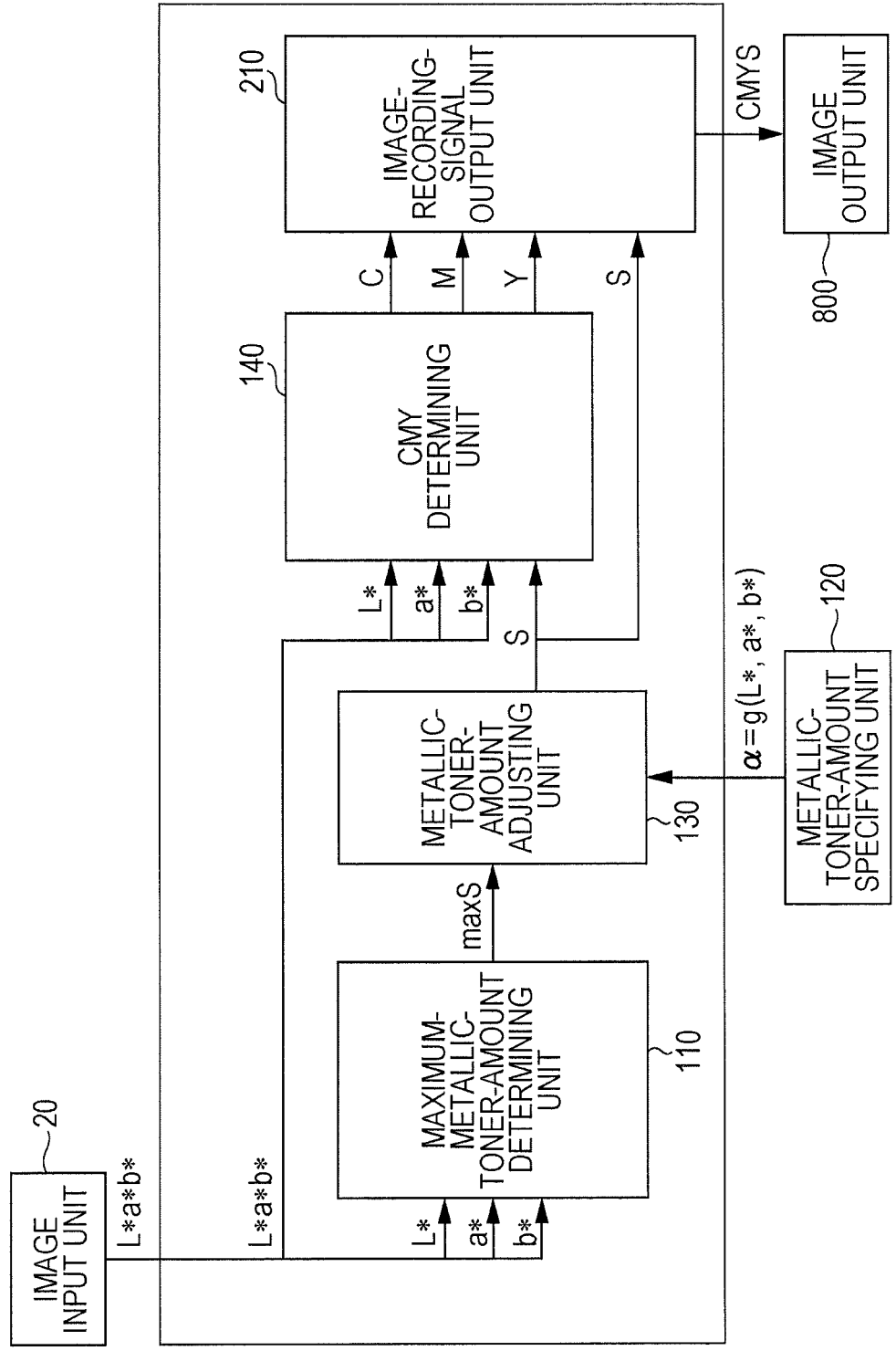
FIG. 16 is a block diagram of an image forming apparatus according a second comparative example.

FIG. 16 is a block diagram of an image forming apparatus 10 according a second comparative example. As described above, the image forming apparatus 10 according to the second exemplary embodiment (see FIG. 9) includes the image input unit 20, the maximum-metallic-toner-amount determining unit 110, the metallic-toner-amount specifying unit 120, the metallic-toner-amount adjusting unit 130, the CMY determining unit 140, the maximum-black-toner-amount determining unit 150, the black-toner-amount specifying unit 160, the black-toner-amount adjusting unit 170, the CMY correcting unit 190, the image-recording-signal output unit 210, and the image output unit 850. In contrast, the image forming apparatus 10 according to the second comparative example includes the image input unit 20, the maximum-metallic-toner-amount determining unit 110, the metallic-toner-amount specifying unit 120, the metallic-toner-amount adjusting unit 130, the CMY determining unit 140, the image-recording-signal output unit 210, and the image output unit 850; but does not include the maximum-black-toner-amount determining unit 150, the black-toner-amount specifying unit 160, the black-toner-amount adjusting unit 170, and the CMY correcting unit 190.

Therefore, with the image forming apparatus 10 according to the second comparative example, the UCR processing using the black toner by using the maximum-black-toner-amount determining unit 150, the black-toner-amount specifying unit 160, and the black-toner-amount adjusting unit 170 is not performed.

Figures 17, 18:
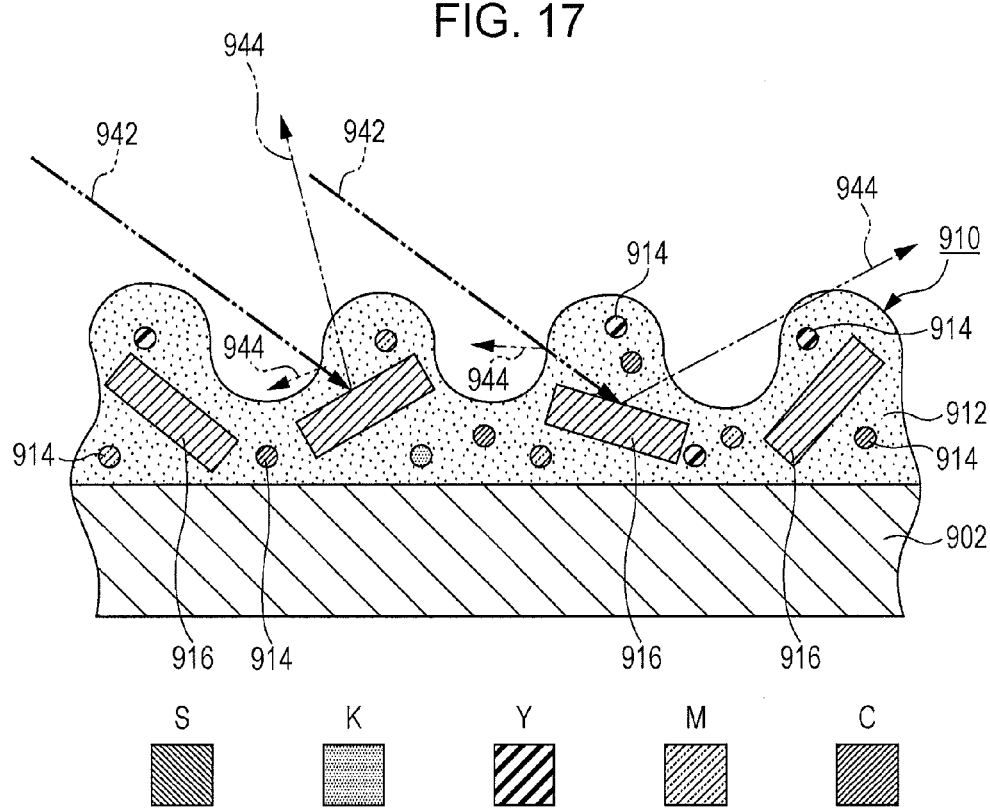
FIG. 17 is a schematic sectional view of an image formed by the image forming apparatus illustrated in FIG. 16.
FIG. 18 is a table showing the results of evaluating an image formed by the image forming apparatus according to the second exemplary embodiment of the present invention and an image formed by the image forming apparatus according to the second comparative example.

FIG. 17 a schematic sectional view of a toner image 910 output to a recording medium from the image output unit 850 of the image forming apparatus 10 according to the second exemplary embodiment of the present invention. As described above, in the toner image 910 formed by using the image forming apparatus 10 according to the second exemplary embodiment, the number of the yellow, magenta, cyan, and black colorant particles 914 dispersed in the toner binder 912 is small (see FIG. 14), because the UCR processing using the black toner is performed. In contrast, as illustrated in FIG. 17, in the toner image 910 formed by using the image forming apparatus 10 according to the second comparative example, which does not perform the UCR processing using the black toner, the number of the yellow, magenta, cyan, and black colorant particles 914 in the toner binder is larger than that of the case where the UCR processing is performed.

Because the number of the yellow, magenta, cyan, and black colorant particles 914 is large, the directions of the metallic colorant particles 916 tend to become random and the sizes of protrusions and recesses on the surface of the toner image 910 tend to become large. Therefore, the proportion of diffuse reflection in reflected light 944, which is the reflection of incident light 942 on the surface of the toner image 910 and the surfaces of the metallic colorant particles 916, tends to be increased. As a result, the luster of the toner image 910 tends to be reduced.

FIG. 18 is a table showing the results of evaluating a toner image 910 formed by the image forming apparatus 10 according to the second exemplary embodiment of the present invention by setting the UCR ratio using the black toner at 100% and a toner image 910 formed by the image forming apparatus 10 according to the second comparative example. In FIG. 18, "○" represents a good evaluation, and "x" represents a bad evaluation.

As illustrated in FIG. 18, in the evaluation of the toner image 910 formed by the image forming apparatus 10 according to the second exemplary embodiment according to the present invention by setting the UCR ratio using the black toner at 100%, the metallic luster of all of "blue gold", "red gold", and "silver" is good. In contrast, in the evaluation of the toner image 910 formed by the image forming apparatus 10 according to the second comparative example, the metallic luster of all of "blue gold", "red gold", and "silver" is bad.

As described above, the image forming apparatus 10 according to the second exemplary embodiment of the present invention includes the image input unit 20, the maximum-metallic-toner-amount determining unit 110, the metallic-toner-amount specifying unit 120, the metallic-toner-amount adjusting unit 130, the CMY determining unit 140, the maximum-black-toner-amount determining unit 150, the black-toner-amount specifying unit 160, the black-toner-amount adjusting unit 170, the CMY correcting unit 190, the image-recording-signal output unit 210, and the image output unit 850. Alternatively, the image output unit 850 may be structured as an independent image forming apparatus; and the image input unit 20, the maximum-metallic-toner-amount determining unit 110, the metallic-toner-amount specifying unit 120, the metallic-toner-amount adjusting unit 130, the CMY determining unit 140, the maximum-black-toner-amount determining unit 150, the black-toner-amount specifying unit 160, the black-toner-amount adjusting unit 170, the CMY correcting unit 190, and the image-recording-signal output unit 210 may be, for example, structured as an image data processing apparatus, such as a controller.

As heretofore described, the present invention may be used for an image forming apparatus, such as a copier, a facsimile, or a printer; and for an image data processing apparatus for processing image data used in such an image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image data processing apparatus comprising:
a total-colorant-amount calculating unit that calculates a total amount of a metallic colorant and a process-color colorant used by an image forming apparatus to form an image having a unit area, the image forming apparatus forming an image by using a white colorant, the metallic colorant, and the process-color colorant respectively including a white pigment, a metallic pigment, and a process-color pigment that is not a white pigment or a metallic pigment;
a white-colorant-amount specifying unit that specifies an amount of the white colorant used by the image forming apparatus to form the image having a unit area on the basis of a calculation result obtained by the total-colorant-amount calculating unit; and
a white-colorant-amount correcting unit that corrects the amount of the white colorant specified by the white-colorant-amount specifying unit,
wherein the white-colorant-amount correcting unit corrects the amount of the white colorant used to form the image having a unit area so that the amount of the white colorant used to form the image having a unit area decreases as the amount of the metallic colorant used to form the image having a unit area increases, and
when the total amount of metallic colorant plus process-color colorant is 200% or more and 300% less, the white-colorant-amount specifying unit specifies the amount of white colorant so that the total amount of the metallic, process-color and white colorant becomes 300%, and when the total amount of metallic colorant plus process-color colorant is more than 300%, the amount of white colorant is set to be 0%.

2. The image data processing apparatus according to claim 1,
wherein the white-colorant-amount specifying unit specifies the amount of the white colorant so that a total amount of the white colorant, the metallic colorant, and the process-color colorant used to form the image having a unit area is in a range in which the image forming apparatus is capable of forming the image.

3. An image data processing method comprising:
calculating a total amount of a metallic colorant and a process-color colorant used by an image forming apparatus to form an image having a unit area, the image forming apparatus forming an image by using a white colorant, the metallic colorant, and the process-color colorant respectively including a white pigment, a metallic pigment, and a process-color pigment that is not a white pigment or a metallic pigment;
specifying an amount of the white colorant used by the image forming apparatus to form the image having a unit area on the basis of a calculation result obtained by the total-colorant-amount calculating unit; and
correcting the amount of the white colorant specified by the white-colorant-amount specifying unit,
wherein the amount of the white colorant used to form the image having a unit area is corrected so that the amount of the white colorant used to form the image having a unit area decreases as the amount of the metallic colorant used to form the image having a unit area increases, and
when the total amount of metallic colorant plus process-color colorant is 200% or more and 300% or less, specifying the amount of white colorant so that the total amount of the metallic, process-color and white colorant becomes 300%, and when the total amount of metallic colorant plus process-color colorant is more than 300%, setting the amount of white colorant to be 0%.

* * * * *